May 5, 1931.  B. STECHBART  1,803,411
PHOTOGRAPHIC FILM VIEWING AND EDITING APPARATUS
Filed Dec. 3, 1927  2 Sheets-Sheet 1
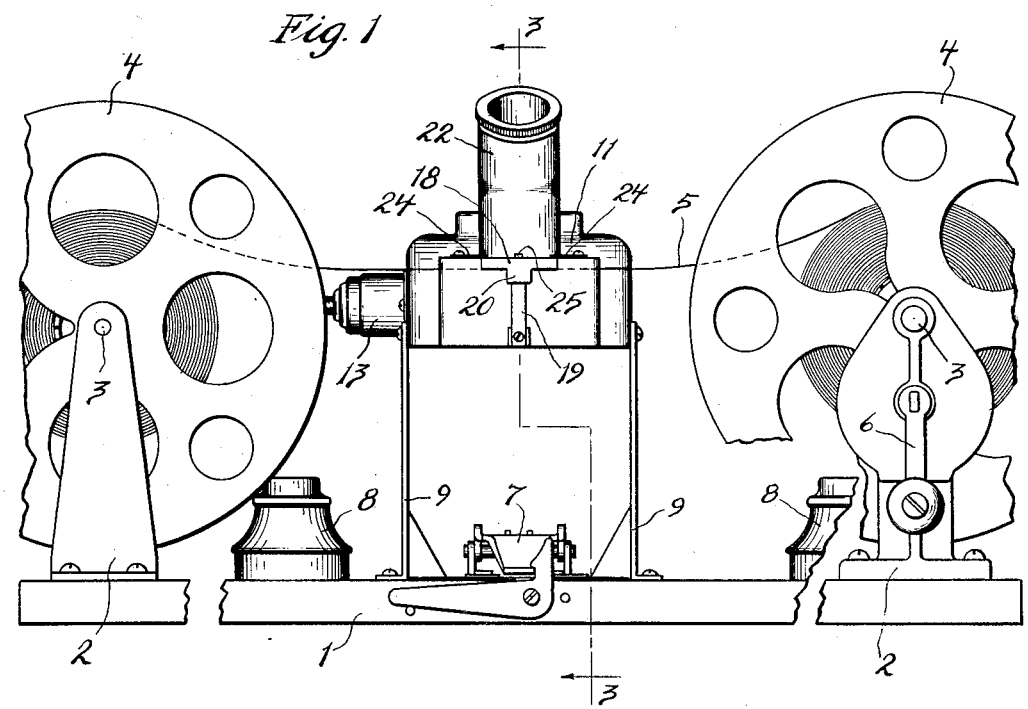
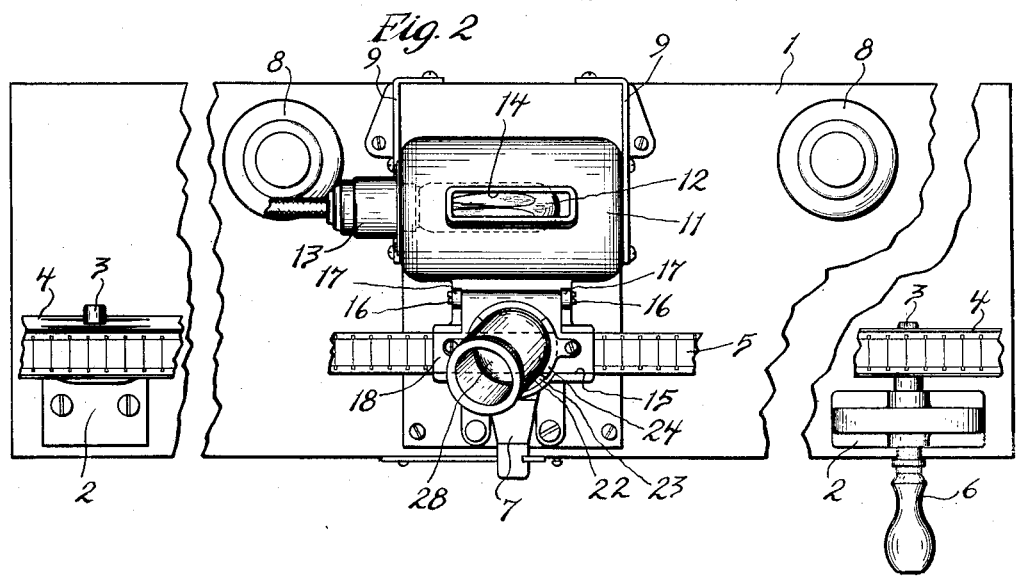
Inventor
Bruno Stechbart
By Miehle + Miehle,
attys.

May 5, 1931. B. STECHBART 1,803,411
PHOTOGRAPHIC FILM VIEWING AND EDITING APPARATUS
Filed Dec. 3, 1927 2 Sheets-Sheet 2

Inventor
Bruno Stechbart
By Miehle & Miehle,
attys.

Patented May 5, 1931

1,803,411

UNITED STATES PATENT OFFICE

BRUNO STECHBART, OF CHICAGO, ILLINOIS, ASSIGNOR TO THE BELL & HOWELL COMPANY, OF CHICAGO, ILLINOIS, A CORPORATION OF ILLINOIS

PHOTOGRAPHIC-FILM VIEWING AND EDITING APPARATUS

Application filed December 3, 1927. Serial No. 237,447.

My invention relates particularly to photographic film viewing and editing means for use on motion picture film although not limited to this use alone.

One of the objects of the invention resides in the provision of an effective and convenient photographic film viewing device, which is particularly adapted for viewing motion picture film with a view toward providing for inspection of the film in an effective and convenient manner.

Another object of the invention resides in the provision of editing apparatus for motion picture film by means of which the film may be edited, as by inspection and splicing, in an effective, convenient, and expeditious manner.

With these objects in view my invention consists in certain features of novelty in the construction, combination, and arrangement of parts by which the said objects and certain other objects, hereinafter appearing, are effected, all as fully described with reference to the accompanying drawings, and more particularly pointed out in the appended claims.

In the said drawings—

Figure 1 is a front elevation of a film viewing and editing means embodying my invention with parts broken away and longitudinally condensed;

Figure 2 is a top plan view of the same with parts broken away and longitudinally condensed;

Like characters of reference indicate like parts in the several views.

Figure 3:
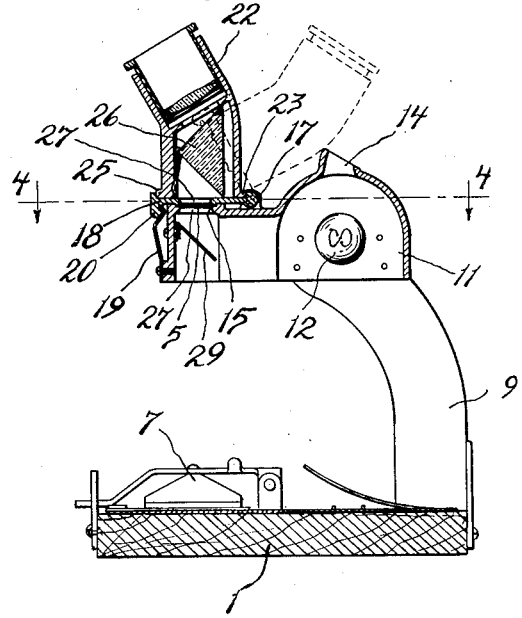
Figure 3 is a section on the line 3—3 of Figure 1.

Referring to the drawings 1 designates a base of elongated rectangular shape, which is preferably formed of wood as shown. Mounted on the base 1 adjacent the forward edge thereof are two spaced film roll mounts 2 which extend upwardly from the base and include elevated horizontally disposed reel spindles 3 for the removable mounting thereon of film reels 4 upon which film 5 is wound. One of the mounts 2 is provided with a winding device, unnecessary to be described, which is operated by a crank 6 for winding the film onto the reel on this mount from the reel on the other mount.

Mounted on the upper surface of the base 1 intermediate the mounts 2 is a film splicer 7 for use on the stretch of the film 5 between the rolls of the film on the reels 4 on the mounts 2. The splicer needs no further description for the present purposes but is fully described and claimed in U. S. Letters Patent No. 1,502,959, issued July 29, 1924, on application filed by J. H. McNabb, for improvement in Film splicing apparatus. Bottles 8 are mounted on the base 1 to contain fluids used for splicing the film.

Secured at the intermediate rear portion of the base 1 are two rearwardly disposed brackets or supports 9 which are spaced longitudinally of the base and disposed at opposite sides of the splicer 7, extend upwardly therefrom. A light enclosing casing 11 has its rearward portion extending between the upper ends of the brackets 9 and secured thereto whereby the casing is supported spaced above the splicer and between the film mounts 2. The casing 11 is open at the bottom, see Figure 3, and the rearward portion thereof is enlarged to form a lamp chamber in which is mounted an incandescent electric lamp 12 by means of a suitable socket 13 mounted at one end of the rear portion of the casing. As so arranged light from the lamp 12 passes through the bottom opening of the casing and illuminates the splicer 7. The rear portion of the casing 11 is provided with a shielded top opening 14 for purposes of ventilation and restricted illumination above the casing.

Figure 4:
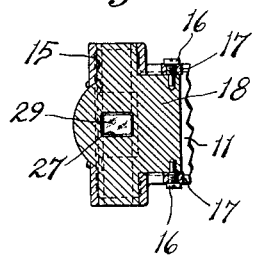
Figure 4 is a partial section on the line 4—4 of Figure 3.

A horizontally disposed film guide is provided at the top of the forward portion of the casing 11 and extends correspondingly with a stretch of film between the rolls of film on the reels 4, and consists as follows. The top of the forward portion of the casing 11 is channeled correspondingly, as designated at 15. See Figures 2, 3, and 4. Pivotally mounted on a horizontal axis extending longitudinally of this channel, by means of opposing co-axial stud screws 16 screw-threaded into upwardly extending lugs 17 on the top of the intermediate portion of the casing 11 and pivotally engaging in bores of an intermediate extension thereof, is a guide member 18, the forward portion of which is adapted to engage in the channel 15 in the horizontal position of this guide member and form therewith a film guide through which the stretch of the film 5 between the rolls of the film on the reels 4 may be drawn, the channel 15 forming the lower film face and the edge guide surfaces of the guide and the lower face of the corresponding portion of the guide member 18 forming the upper film face guide surface of the guide. The guide member 18 is releasably secured in its horizontal or film retaining position by means of a spring latch 19 secured on the front of the casing 11 and releasably engaging a downwardly projecting undercut lug 20 on the intermediate portion of the front of the guide member 18, which intermediate portion of the front of this guide member 18 extends forwardly of the front of the casing 11 through an opening in the forward side of the channel 15. When released the guide member 18 may be swung facewise upwardly and rearwardly out of film retaining position to the position indicated in broken lines in Figure 3 whereby to facilitate insertion and removal of the film in the film guide.

An intermediately angled viewing tube 22 has a coaxial circumferential flange 23 at one end thereof, and this flanged end of the tube is pivotally engaged in a counterbore in the upper surface of the guide member 18 overlying the intermediate portion of the guide portion thereof. See Figures 2, 3, and 4. Segment members 24 are secured on the upper surface of the guide member 18 at opposite sides of the tube 22 and overlie the flange 23 whereby to retain the tube 22 engaged for angular movement in the aforementioned counterbore of the guide member 18. As so mounted the angled viewing tube 22 is carried with the movable guide member 18, with the portion thereof adjacent this guide member disposed normal to the plane of the guide, for angular movement with respect to this guide member on the axis of said adjacent portion of the tube for purposes hereinafter appearing. A stop lug 25 is formed on the upper surface of the flange 23 for engagement with ends of the segment members 24 to limit said angular movement of the viewing tube. See Figures 1 and 3.

A triangular glass reflecting prism 26 is mounted in the portion of the viewing tube 22 adjacent the guide member 18 and has one face disposed upright with respect the plane of the film guide and another face thereof facing generally in the direction of the other or upper portion of the viewing tube. See Figure 3. The above mentioned film guide is provided with a facewise viewing aperture therethrough disposed in central relation with the lower or adjacent portion of the viewing tube 22, and this aperture consists of registered apertures 27 through the guide portion of the guide member 18 and through the portion of the upper wall of the casing 11 forming the channel 15, this last mentioned aperture communicating the viewing aperture of the film guide with the enclosure of the casing 11. See Figures 3 and 4.

The prism 26 reflects the image on the film at the aperture of the film guide upwardly through the upper portion of the viewing tube for the viewing of the image from the upper end of the viewing tube, and a magnifier 28 is mounted in the upper portion of the viewing tube for magnifying the image.

A reflector 29 is mounted in the casing 11 below the film guide and is disposed to reflect light from the lamp 12 upwardly through the viewing aperture of the film guide to illuminate the film at the aperture of the guide for the viewing thereof.

As before described the viewing tube 22 carrying the prism 26 is adjustable on an axis normal to the plane of the film guide, so that the images viewed through the tube may be turned to their normal position, the action of the prism effecting this result in a manner unnecessary to be described.

It will be observed that the viewing means provides for the convenient and effective viewing of the film, the image viewed being adequately illuminated and being turned to best suit the user's convenience. It will be further observed that editing of motion picture film may be conveniently effected, the splicer and viewing means being so related and disposed between the film roll mounts that the film may be conveniently inspected and spliced as it passes between the film roll mounts, and the lamp 12, shielded within the casing 11, providing adequate directed illumination for both the inspection and splicing of the film.

While I have described and shown the preferred embodiment of my invention I do not wish to be limited to the precise details of construction shown as changes may readily be made without departing from the spirit of my invention, but having thus described my invention, I claim as new and desire to secure by Letters Patent the following:

1. In a film viewing device the combination with a film guide provide with a facewise aperture therethrough and including a film face guide member pivoted with respect to the other film face guide member of the guide for facewise movement into and out of film retaining position, an intermediately angled viewing tube carried with said pivoted guide member in associated relation with said aperture and mounted, with the portion thereof adjacent the movable guide member disposed normal to the plane of the guide, for angular movement with respect to the pivoted guide member on the axis of said adjacent portion of the tube, a triangular glass reflecting prism mounted in said adjacent portion of the tube and having one face thereof disposed upright with respect to the plane of said guide and having another face thereof facing generally in the direction of the other portion of said tube, and a magnifier in said other portion of said tube.

2. In a film viewing device the combination with an elevated light enclosing casing provided with a bottom opening, of a horizontally disposed film guide on the top of said casing adjacent one end thereof and provided with a viewing aperture therethrough and communicating with the enclosure of said casing and including a top film face guide member pivoted longitudinally with respect the other guide member of the guide for facewise movement into and out of film retaining position, an intermediately angled viewing tube carried with said pivoted guide member in associated relation with said aperture, with the portion thereof adjacent the movable guide member disposed normal to the plane of the guide, for angular movement with respect to the pivoted guide member on the axis of said adjacent portion of the tube, a reflector mounted in said adjacent portion of the tube in upright relation with respect to the plane of said guide and facing generally in the direction of the other portion of said tube, a magnifier in said other portion of the tube, and a second reflector in the enclosure of said casing below said aperture of the guide and adapted to reflect light from a light source at the other end of the enclosure of said casing upwardly through said aperture.

3. In a motion picture film editing device the combination with a film splicer, of a light enclosing casing disposed above said splicer and provided with a bottom opening, a source of light in said casing adapted to illuminate said splicer through said bottom opening, a film viewing device associated with said casing and having an apertured film guide the aperture of which communicates with the enclosure of said casing, and a reflector in said casing for reflecting light from said source through said aperture.

4. In a motion picture film editing device the combination with a film splicer, of a light enclosing casing provided with a bottom opening, rearwardly disposed support means supporting said casing spaced above the splicer, a source of light in the rearward portion of said casing and adapted to illuminate the splicer through said bottom opening, a film viewing device including a horizontally disposed film guide at the top of the forward portion of said casing and provided with a viewing aperture communicating with the enclosure of the casing, and a reflector in said casing below said aperture adapted to reflect light from said light source upwardly through said viewing aperture.

5. In a motion picture film editing device the combination with a pair of spaced film roll mounts, of a film splicer disposed therebetween for use on a stretch of film extending between said mounts, a light enclosing casing provided with a bottom opening, rearwardly disposed support means supporting said casing spaced above said splicer between said mounts, a film viewing device on the forward portion of said casing for use on said stretch of film, an incandescent electric lamp in said casing for illuminating said splicer through said bottom opening, and a reflector in said casing and adapted to reflect light from said lamp for illuminating a film in said viewing device.

6. In a motion picture film editing device the combination with a pair of spaced film roll mounts, of a film splicer disposed therebetween for use on a stretch of film extending between said mounts, a light enclosing casing provided with a bottom opening, rearwardly disposed support means supporting said casing spaced above said splicer between said mounts, a film viewing device on the top of the forward portion of said casing for use on said stretch of film and including a horizontally disposed film guide provided with a facewise viewing aperture therethrough and communicating with the enclosure of said casing, an incandescent electric lamp in the rearward portion of said casing and adapted to illuminate said splicer through said bottom opening, and a reflector in said casing and adapted to reflect light from said lamp upwardly through said viewing aperture.

7. In a motion picture film editing device the combination with a pair of spaced film roll mounts, of a film splicer disposed therebetween for use on a stretch of film extending between said mounts, a light enclosing casing provided with a bottom opening, rearwardly disposed support means supporting said casing spaced above said splicer between said mounts, a film viewing device on said casing for use on said stretch of film, and illuminating means in said casing for illuminating said splicer through said bottom opening and for illuminating a film in said viewing device.

In witness whereof I hereunto affix my signature this twenty-sixth day of November, 1927.

BRUNO STECHBART.